Dec. 24, 1957 C. W. MUELLER 2,817,613

SEMI-CONDUCTOR DEVICES WITH ALLOYED CONDUCTIVITY-TYPE DETERMINING SUBSTANCE

Filed Jan. 16, 1953

INVENTOR.
Charles W. Mueller

BY J. L. Whittaker
ATTORNEY

United States Patent Office 2,817,613

Patented Dec. 24, 1957

2,817,613

SEMI-CONDUCTOR DEVICES WITH ALLOYED CONDUCTIVITY-TYPE DETERMINING SUBSTANCE

Charles W. Mueller, Princeton, N. J., assignor to Radio Corporation of America, a corporation of Delaware Application January 16, 1953, Serial No. 331,603

3 Claims. (Cl. 148—33)

This invention relates to improved semi-conductor devices comprising P-N rectifying junctions and more particularly to improved methods for making such devices.

It is well known to make a semi-conductor device by diffusing into a body of semi-conducting material containing certain impurities, another material having properties complementary to those of the impurities already present. For eample, in the production of junction type transistors, it is common to provide a body of germanium or of silicon containing impurities evenly dispersed throughout the body of such a character that electrical conduction takes place through the body principally by means of electrons made available by the impurities. Such impurities may comprise elements selected from the fifth column of the periodic table. Such a body is said to possess N-type conductivity. Upon opposite surfaces of such a body, approximately .005″ in thickness, are placed two bodies of a substance which when diffused into the germanium body provides P-type conductivity. There is thus formed a device comprising two closely spaced P–N rectifying junctions.

It has been found that in the operation of such a device, it is desirable that the conductivities of the material in different parts of the device bear certain relationships one to another. This will be seen by reference to an article entitled, "The Theory of P–N Junctions in Semi-Conductors" by W. Shockley in the Bell System Technical Journal for July 1949. In particular it is desirable that the conductivity of the semi-conducting material be as small as possible with respect to one electrode, and that it be large with respect to the other electrode. These relationships are inconsistent and lead to the selection of a semi-conductor material having a compromise conductivity for use in a semi-conducting body for forming a device such as a transistor.

Figure 1 is a schematic representation of a P–N–P type junction semi-conductor device as employed in a circuit. The entire device, although represented as having three distinct portions, is a single solid crystalline wafer. The vertical lines 3 and 5 represent the P–N rectifying junctions. The area 2 labelled P, to the left of the area 4 labelled N, is called an emitter electrode. The other area 6, to the right of area 4, labelled P, is called a collector electrode. The area 4 is of N conductivity type semiconductive crystalline material, and is called the base. The symbols $\sigma_1$, $\sigma_2$, $\sigma_3$, and $\sigma_4$, represent the conductivities of the materials in the areas immediately adjacent to where they are drawn. In these semi-conductor devices it is desirable that $\sigma_2$ be as much smaller than $\sigma_1$ as possible, and that $\sigma_3$ should be relatively large compared to $\sigma_2$. Since the wafer must consist essentially of a single crystal lattice structure, the problem arises of how to provide different values of conductivity on different sides of the base.

It should, of course, be borne in mind that the conductivity of an N-type semi-conducting material is considered principally to be provided by electron conduction, and that the conductivity in a P-type semi-conductor is considered principally to be provided by "hole" conduction.

It has previously been shown that the conductivity of germanium and of silicon may be varied by bombarding the surface of the material with sub-atomic particles such as, for instance, deuterons, neutrons or alpha particles. See, for example, an article by R. E. Davis et al., entitled "Nucleon Bombarded Germanium Semi-conductors, II," published by The United States Atomic Energy Commission (1948). Such bombardment affects the conductivity of a germanium body, and the penetration beneath the surface bombarded is readily controlled so that the conductivity on one side of a relatively thin body of germanium (.001″ to .005″) may be greatly affected without affecting the conductivity of the germanium on the other side of the body. This effect on conductivity is thought to be due to the creation of lattice defects in the crystal structure of the germanium. It is also possible to change N-type germanium to P-type germanium by means of bombardment with these sub-atomic particles.

It is also desirable in forming a semi-conductor device to control the degree of diffusion of the impurity material into the body of germanium. In many instances it is desirable to increase such diffusion so that the effective junction formed is less abrupt and occupies a larger volume within the semi-conducting body. By reference to an article by A. D. le Claire entitled, "Diffusion of metals in metals," printed in vol. I of Progress in Metal Physics (1949) it will be seen that lattice defects have a relatively large effect upon diffusion in metals. It will thus be seen that the creation of lattice defects in a semi-conducting body not only affects the conductivity of the body but also permits a more rapid and thorough diffusion of an impurity into it.

According to the present invention, an improved semi-conductor device is formed by the method including the steps of bombarding a semi-conducting material such as germanium or silicon with sub-atomic particles and then diffusing impurity material into the bombarded portion of the semi-conductor.

An object of the invention is to provide an improved P–N rectifying junction.

Another object of the invention is to provide an improved method to control diffusion of impurity substances into a body of semi-conducting material.

Another object of the invention is to provide an improved method simultaneously to control the conductivity of a portion of a semi-conducting body and the diffusion of an impurity substance into that portion.

Another object of the invention is to provide a semi-conductor device having an improved P–N rectifying junction.

Still another object of the invention is to provide an improved semi-conductor device having two P-N rectifying junctions each having different characteristics.

A further object of the invention is to provide an improved semi-conductor device having at least two P-N rectifying junctions in which the conductivity of the material between the junctions is greater in an area adjacent to one junction than in an area adjacent to the other junction and in which said junctions have different characteristics.

These and other objects will be more readily apparent and the invention more easily understood by reference to the following detailed description and to the drawing of which:

Similar reference characters are used for similar elements throughout the drawing.

In a preferred embodiment of the invention a wafer of N-type germanium consisting essentially of a single crystal structure, about 0.25" x 0.1" x 0.005" is subjected to bombardment by deuterons upon one of its two largest surfaces. The deuterons may be provided from any available source such as, for instance, a cyclotron or an atomic pile, and they are directed to impinge upon the surface approximately perpendicular thereto with energies of the order of 10 million electron volts (10 m. e. v.) for about one second. Suitable cooling means are provided, such as a relatively large brass plate in contact with another surface of the germanium body, to prevent undesirable heating of the germanium.

Alpha particles may be used, in which case their energies should approximate 20 m. e. v. Many other sub-atomic particles are also suitable for bombarding semi-conducting bodies to create lattice defects or displacements. It is only essential that the bombarding particles have sufficient energy to displace atoms of the crystal of semi-conducting material from their original places in the lattice.

After preparation in the above described manner, P-type impurities such as provided by indium are diffused into opposite sides of the germanium body by well known means. Due to the creation of lattice defects by the bombardment, the impurities diffuse into the bombarded side of the germanium more rapidly and farther than into the other side.

Figure 1:
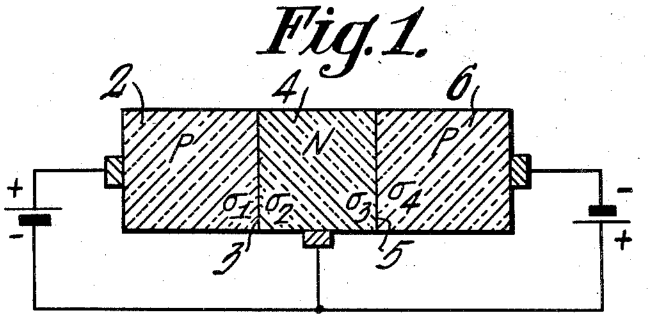
Figure 1 is a schematic representation of a semi-conductor device made in accordance with the invention.
Figure 2:
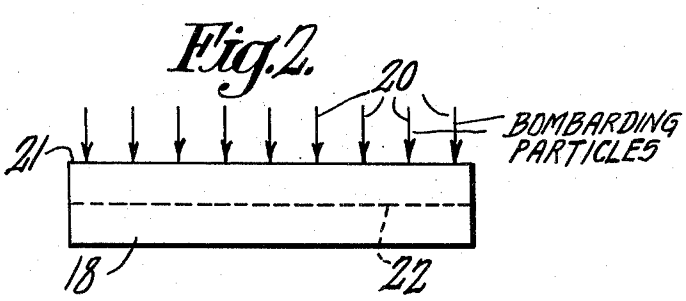
Figure 2 is a schematic representation of a body of semi-conducting material being bombarded with sub-atomic particles.

Figure 2 illustrates the bombardment of a body of single crystalline N-type germanium by sub-atomic particles denoted by the arrows 20. Some of the particles penetrate beneath the surface 21 of the body to a depth indicated by the dotted line 22 with sufficient energy to create lattice defects in the crystal structure of the body.

Figure 3:
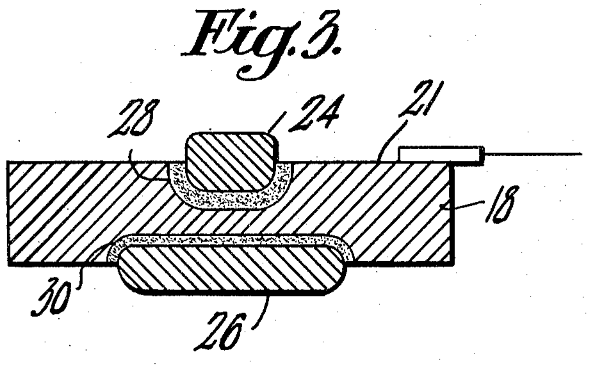
Figure 3 is a schematized, enlarged partial cross-sectional view of a device made according to the invention.

Figure 3 is a schematic view of a semi-conductor device in which the bombarded body, treated in the manner explained in connection with Figure 2, is incorporated as the base wafer. Small portions of an impurity substance, such as indium, capable of imparting P-type conductivity characteristics are placed on opposite sides of the germanium wafer 18 and the assembly heated to a temperature above the melting point of the impurity substance. The molten impurity substance alloys with part of the germanium, the alloy portions being designated 24 and 26. Around the peripheries of the alloy zones 24 and 26 the impurity substance penetrates further by diffusion forming P-N rectifying junctions 28 and 30. The junction 28 formed on the bombarded side 21 of the wafer 18 is thicker than the other junction 30, because as explained above, the impurity substance alloys and diffuses more rapidly into the bombarded side since that side has more lattice defects. The junction 28 formed adjacent the bombarded surface 21 may be employed in a circuit as an emitter junction, while the opposite junction 30 may be a collector junction. If desired, the opposite arrangement may be used, in which the thicker junction 28 is the collector, and junction 30 is the emitter. It is not possible to show in the drawing the conductivities of the various parts of the device; however, there has been indicated the increased diffusion which has occurred within that region which has been bombarded. This is apparent in a physical comparison of the two P-N junctions, the emitter junction 28 being considerably thicker than the collector junction 30. The conductivity of the base 18 has been increased on the bombarded side, which is the part next to the emitter junction 28.

There is thus formed a semi-conductor device having one rectifying junction similar to that of previously described devices and a second rectifying junction having different characteristics. In addition, the two rectifying junctions are enabled to be formed slightly closer together than in previously described devices, thus permitting operation of the device at higher electrical frequencies.

The practice of the invention is also applicable to

N-P-N semi-conductor devices. In this case the bombardment is carried out in exactly similar manner but upon the surface of a body of P-type semi-conducting material, and instead of a decrease in conductivity of the bombarded surface an increase is noted; and consequently the bombarded side of the body is preferably used to form the collector junction of a device. This increase in conductivity is to be expected, as explained in the article by Davis, et al, referred to above, since P-type germanium conducts principally through lattice defects or electron-accepting impurity centers, or both, and bombardment increases the number of lattice defects.

In forming P-N-P devices according to the invention, it is desirable to start with an N-type semi-conducting body having relatively high conductivity, to provide for the desired conductivity adjacent the collector; then bombardment decreases the conductivity on that portion of its surface to be used in forming an emitter junction. On the other hand, when forming N-P-N devices according to the invention it is desirable to start with a P-type body of relatively low conductivity, the bombardment serving to increase the conductivity of that portion of its surface to be used in forming a collector junction.

There have thus been described improved semi-conductor devices having advantageous electrical properties, and improved methods for making such devices having P-N rectifying junctions of novel and improved characteristics.

What is claimed is:

1. A semiconductor device comprising a body of a given conductivity type material selected from the group consisting of germanium and silicon; portions of a conductivity type-determining substance alloyed to opposite surfaces of said body, said type-determining substance inducing in said body conductivity of the type opposite said given type; a P-N junction around the periphery of each said alloyed substance, each junction being disposed between said alloyed substance and said body; the conductivity of said body between said junctions being greater adjacent to one of said junctions than adjacent to the other of said junctions.

2. A semiconductor device comprising an N-conductivity type germanium body; portions of indium alloyed to opposite surfaces of said body; a P-N junction around the periphery of each said alloyed indium portion, each junction being disposed between said alloyed indium portion and said germanium body; the conductivity of said germanium body between said junctions being greater adjacent to one of said junctions than adjacent to the other of said junctions.

3. A semiconductor device comprising an N-conductivity type germanium wafer, containing in order: a first portion of indium alloyed to one surface of said wafer; a first zone of germanium alloyed with indium, said zone being of P-conductivity type and being immediately adjacent to said first portion of indium; a first P-N junction between said first P-type zone and said N-type wafer; a portion of said N-type wafer; a second P-N junction between said N-type wafer portion and a second P-type zone of germanium alloyed with indium, said second junction being closely spaced to said first junction; a second portion of indium alloyed to the opposite surface of said wafer and immediately adjacent to said second P-type zone; the conductivity of said wafer portion between said junctions being greater adjacent to said first junction than adjacent to said second junction.

References Cited in the file of this patent

UNITED STATES PATENTS

| | | |
|---|---|---|
| 2,449,484 | Jaffe | Sept. 14, 1948 |
| 2,569,347 | Shockley | Sept. 25, 1951 |
| 2,588,254 | Lark | Mar. 4, 1952 |
| 2,623,102 | Shockley | Dec. 23, 1952 |
| 2,694,024 | Bond et al. | Nov. 9, 1954 |
| 2,708,646 | North | May 17, 1955 |
| 2,730,470 | Shockley | Jan. 10, 1956 |